US011641605B2

(12) United States Patent
Deenoo et al.

(10) Patent No.: US 11,641,605 B2
(45) Date of Patent: May 2, 2023

(54) METHODS FOR ENHANCED MOBILITY IN WIRELESS SYSTEMS

(71) Applicant: INTERDIGITAL PATENT HOLDINGS, INC., Wilmington, DE (US)

(72) Inventors: Yugeswar Deenoo, Chalfont, PA (US); Mouna Hajir, Montreal (CA); Ghyslain Pelletier, Montreal (CA)

(73) Assignee: Interdigital Patent Holdings, Inc., Wilmington, DE (US)

( * ) Notice: Subject to any disclaimer, the term of this patent is extended or adjusted under 35 U.S.C. 154(b) by 34 days.

(21) Appl. No.: 17/045,027

(22) PCT Filed: Mar. 27, 2019

(86) PCT No.: PCT/US2019/024397
§ 371 (c)(1),
(2) Date: Oct. 2, 2020

(87) PCT Pub. No.: WO2019/195060
PCT Pub. Date: Oct. 10, 2019

(65) Prior Publication Data
US 2021/0168678 A1 Jun. 3, 2021

Related U.S. Application Data

(60) Provisional application No. 62/736,290, filed on Sep. 25, 2018, provisional application No. 62/652,163, filed on Apr. 3, 2018.

(51) Int. Cl.
H04W 36/00 (2009.01)
H04W 76/19 (2018.01)
(Continued)

(52) U.S. Cl.
CPC ..... *H04W 36/00837* (2018.08); *H04W 24/08* (2013.01); *H04W 36/305* (2018.08); *H04W 76/19* (2018.02)

(58) Field of Classification Search
None
See application file for complete search history.

(56) References Cited

U.S. PATENT DOCUMENTS

| 11,452,012 B2 | 9/2022 | Jiang |
| 2014/0126545 A1 | 4/2014 | Tamura et al. |

(Continued)

FOREIGN PATENT DOCUMENTS

| WO | 2010/057127 | 5/2010 |
| WO | 2010057127 A1 | 5/2010 |

(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Suhail Khan
(74) *Attorney, Agent, or Firm* — Volpe Koenig P.C.

(57) ABSTRACT

Methods, devices, and systems for communication by a wireless transmit/receive unit (WTRU) associated with a source cell. The WTRU is configured with a conditional reconfiguration which includes a trigger condition and a configured target cell. The WTRU detects an occurrence of an impairment event resulting in impairment to operation of the WTRU in the source cell. If the impairment event satisfies the trigger condition, a reconfiguration is performed with the configured target cell. If the impairment event does (Continued)

not satisfy the trigger condition, a target cell is selected based on a cell selection procedure, and if the is configured with a conditional reconfiguration for the selected target cell, a reconfiguration is performed with the selected target cell; and if the WTRU is not configured with a conditional reconfiguration for the target cell, a reestablishment is performed with the selected target cell.

20 Claims, 8 Drawing Sheets

(51) Int. Cl.
*H04W 36/30* (2009.01)
*H04W 24/08* (2009.01)

(56) References Cited

U.S. PATENT DOCUMENTS

2019/0028938 A1* 1/2019 Park ................ H04W 36/0016
2019/0223073 A1* 7/2019 Chen ................ H04W 36/0079

FOREIGN PATENT DOCUMENTS

WO 2012/176010 12/2012
WO 2015050336 A1 4/2015

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
InterDigital Inc., "Mobility for NR-U," 3GPP RAN WG2 Meeting #103, R2-1811455, Gothenburg, Sweden (Aug. 20-24, 2018).
InterDigital Inc., "Triggers for Conditional Handover in NR," 3GPP TSG-RAN WG2 Meeting #105, R2-1901585, Athens, Greece (Feb. 25-Mar. 1, 2019).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.4.0 (Dec. 2018).
Third Generation Partnership Project, "Technical Specification Group Radio Access Network NR; NR and NG-RAN Overall Description; Stage 2 (Release 15)," 3GPP TS 38.300 V15.1.0 (Mar. 2018).
Third Generation Partnership Project, "Technical Specification Group Radio Access Network; NR; NR and NG-RAN Overall Description; Stage 2 (Release 15)," 3GPP TS 38.300 V15.4.0 (Dec. 2018).
Third Generation Partnership Project, "Technical Specification Group Radio Access Network; NR; Medium Access Control (MAC) protocol specification (Release 15)," 3GPP TS 38.321 V15.1.0 (Mar. 2018).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network NR Radio Resource Control (RRC) protocol specification (Release 15)," 3GPP TS 38.331 V15.0.0 (Dec. 2017).
Third Generation Partnership Project, "Technical Specification Group Radio Access Network; NR; Radio Resource Control (RRC) protocol specification (Release 15)," 3GPP TS 38.331 V15.1.0 (Mar. 2018).
Third Generation Partnership Project, "Technical Specification Group Radio Access Network NR Radio Resource Control (RRC) protocol specification (Release 15)," 3GPP TS 38.331 V15.4.0 (Dec. 2018).
InterDigital Communications, "Conditional Reconfiguration for NR," 3GPP TSG-RAN WG2 NR Ad Hoc 1801, R2-1801109, Reno, USA (Nov. 27-Dec. 1, 2017).
Huawei et al., "Analysis on conditional handover," 3GPP TSG-RAN WG2 #97bis, R2-1703384, Spokane, USA (Apr. 3-7, 2017).
Samsung, "Introduction of Conditional handover," 3GPP TSG-RAN2 AH—1801, R2-1801493, Vancouver, Canada (Jan. 22-26, 2018).

* cited by examiner

METHODS FOR ENHANCED MOBILITY IN WIRELESS SYSTEMS

CROSS-REFERENCE TO RELATED APPLICATIONS

This application is the U.S. National Stage, under 35 U.S.C. § 371, of International Application No. PCT/US2019/024397 filed Mar. 27, 2019, which claims the benefit of U.S. Provisional Application No. 62/652,163 filed Apr. 3, 2018 and U.S. Provisional Application No. 62/736,290 filed Sep. 25, 2018, the contents of which are incorporated herein by reference.

BACKGROUND

Summary

Mobile communications are in continuous evolution and mobile networks are at the doorstep of their fifth generation (5G). As with previous generations, new use cases largely contributed in setting the requirements for the new system. The 5G air interface, and its new radio (NR) access technology, is expected to enable use cases such as improved broadband performance (IBB), industrial control and communications (ICC) and vehicular applications (V2X), and massive machine-type communications (mMTC).

Methods, devices, and systems for communication by a wireless transmit/receive unit (WTRU) associated with a source cell. The WTRU is configured with a conditional reconfiguration which includes a trigger condition and a configured target cell. The WTRU detects an occurrence of an impairment event resulting in impairment to operation of the WTRU in the source cell. If the impairment event satisfies the trigger condition, a reconfiguration is performed with the configured target cell. If the impairment event does not satisfy the trigger condition, a target cell is selected based on a cell selection procedure, and if the WTRU is configured with a conditional reconfiguration for the selected target cell, a reconfiguration is performed with the selected target cell; and if the WTRU is not configured with a conditional reconfiguration for the target cell, a reestablishment is performed with the selected target cell.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
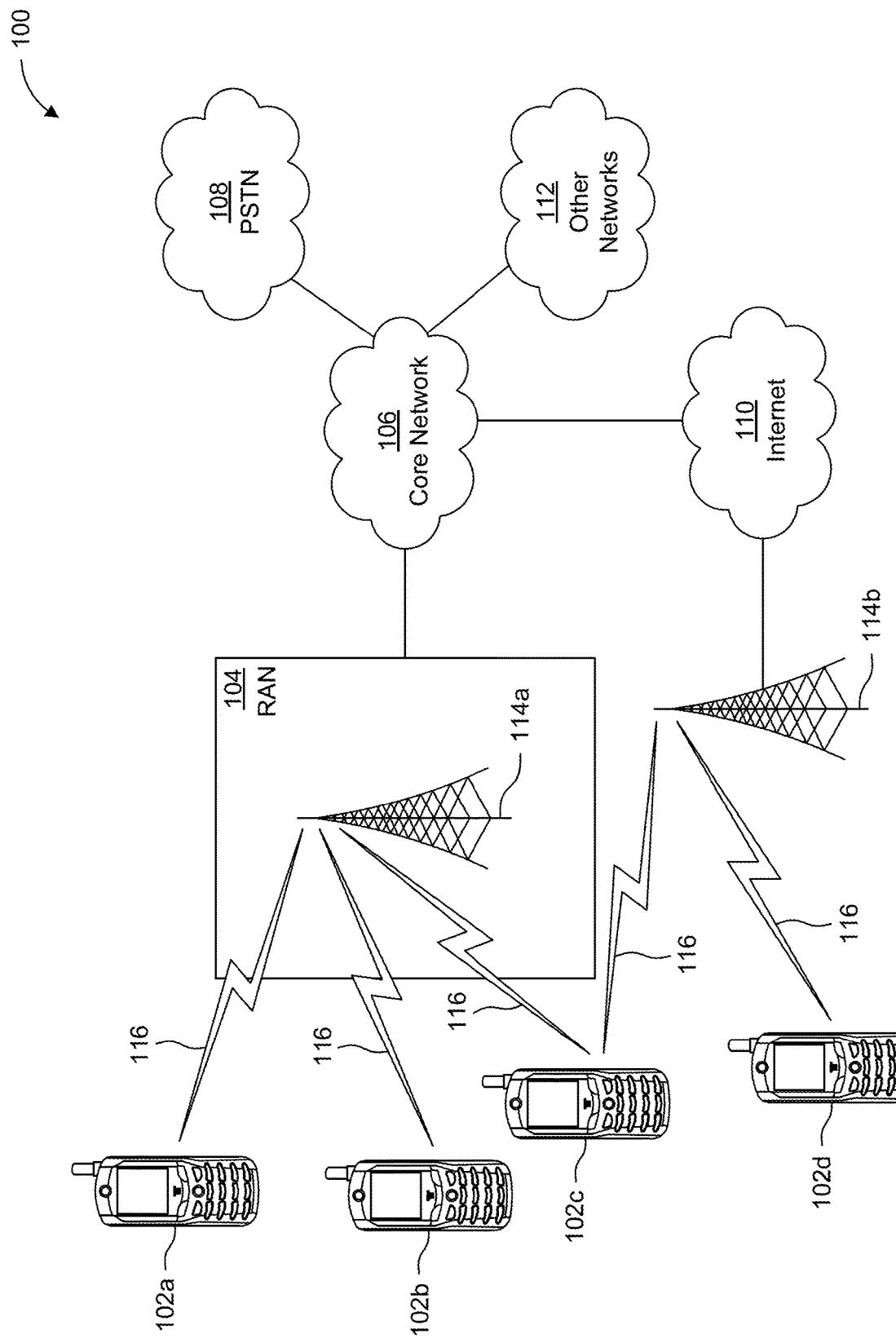
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers.

For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
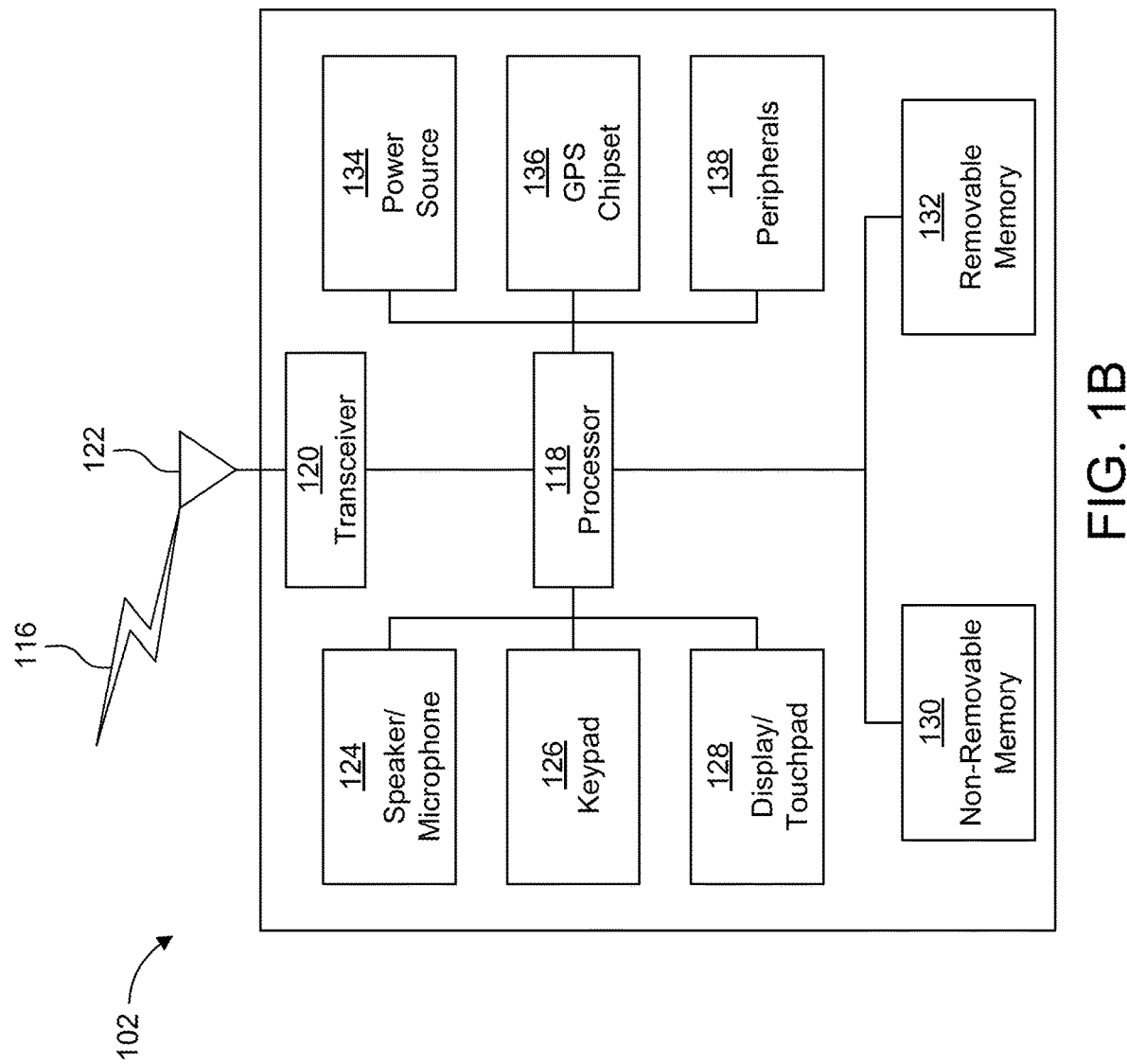
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
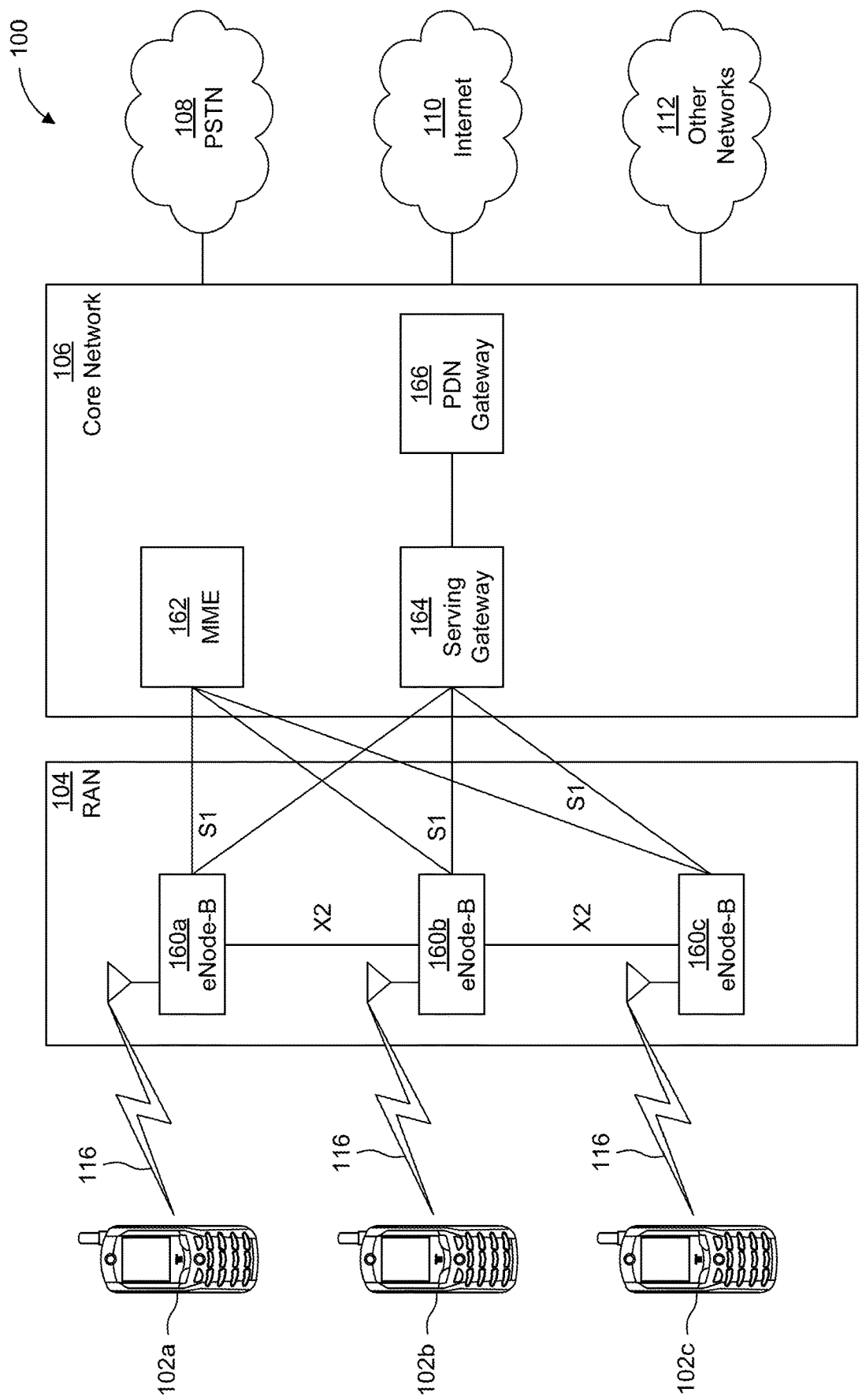
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as machine type communication (MTC) devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
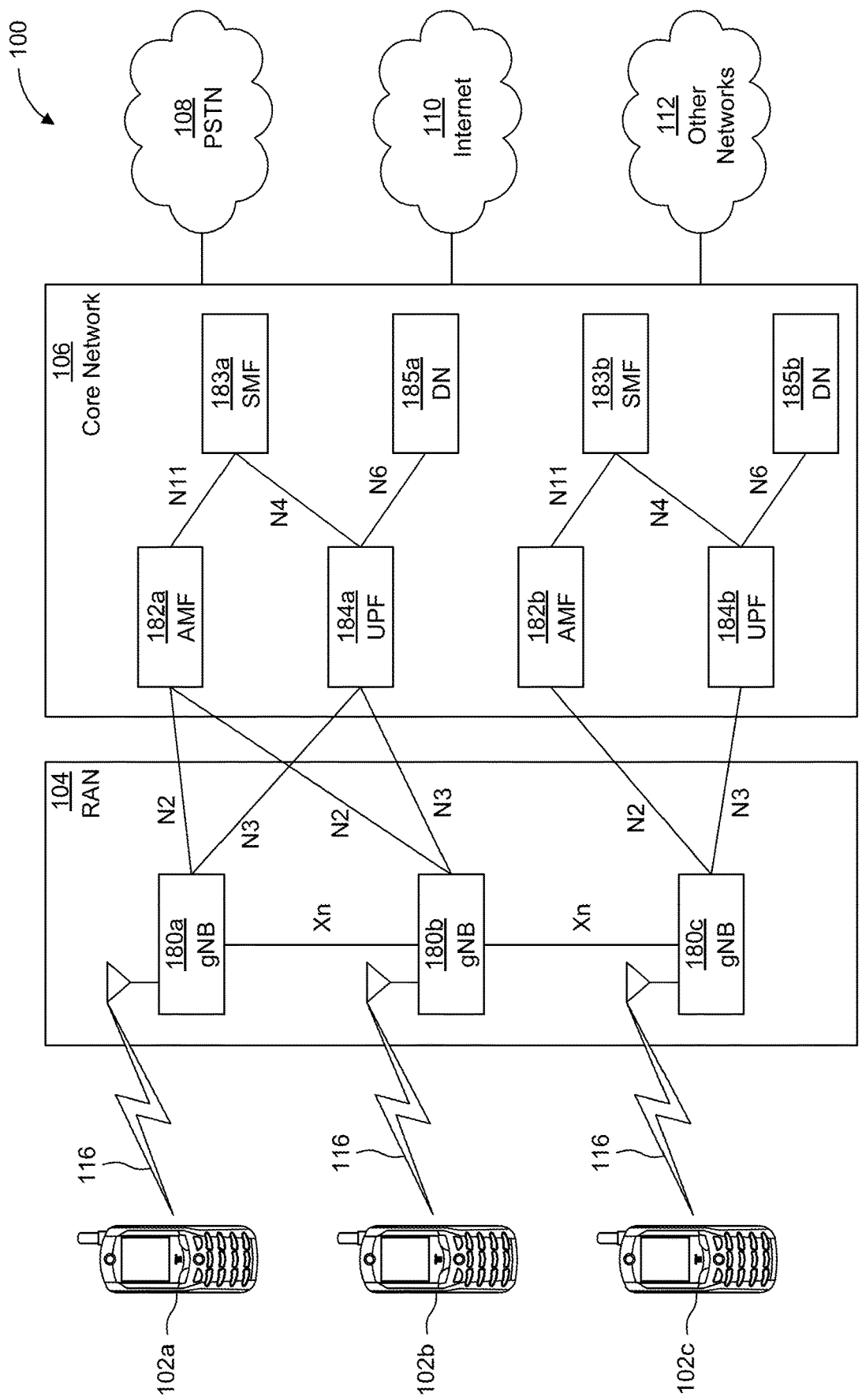
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As described above, the fifth generation (5G) air interface, and its new radio (NR) access technology, is expected to enable use cases such as improved broadband performance (IBB), industrial control and communications (ICC) and vehicular applications (V2X), and massive machine-type communications (mMTC).

Some such use cases may require support for ultra-reliable low transmission latency (URLLC) communications. Air interface latency as low as 1 ms RTT, for example, may require support for TTIs between 100 μs and 250 μs. Some such use cases may require for ultra-low access latency (e.g., the time from initial system access until the completion of the transmission of the first user plane data unit). For example, some ICC and V2X use cases may require an end-to-end (e2e) latency of less than 10 ms.

Further, some such use cases may require support for ultra-reliable transmission (URC). Transmission reliability may need to be much better than what is possible with legacy LTE systems. For example, a possible target may be close to 99.999% transmission success and service availability. Another consideration may be support for mobility speeds in the range of 0-500 km/h. Some ICC and V2X use cases may require a packet loss ratio of less than $10e^{-6}$.

Some use cases may require support for MTC operation, e.g., including narrowband operation. The NR air interface may efficiently support narrowband operation (e.g., using less than 200 KHz), extended battery life (e.g., up to 15 years of autonomy), and minimal communication overhead for small and infrequent data transmissions (e.g., low data rate in the range of 1-100 kbps) with access latency of seconds to hours.

Orthogonal Frequency-Division Multiplexing (OFDM) may be used as the basic signal format for data transmissions in both LTE and in IEEE 802.11. OFDM may efficiently divide a spectrum into multiple parallel orthogonal subbands. Each subcarrier is shaped using a rectangular window in the time domain leading to sinc-shaped subcarriers in the frequency domain. OFDMA may require frequency synchronization and tight management of uplink timing alignment within the duration of the cyclic prefix to maintain orthogonality between signals and to minimize inter-carrier interference. This tight synchronization may also not be well-suited in a system where a WTRU is connected to multiple access points simultaneously. Additional power reduction may also be applied to uplink transmissions to be compliant with spectral emission requirements of adjacent bands. This may be particularly relevant in the presence of an aggregation of a fragmented spectrum for the WTRU's transmissions.

In some cases, shortcomings of conventional cyclic prefix (CP) OFDM (CP-OFDM) may be addressed by more stringent radio front end requirements for implementations, e.g., when operating using large amount of contiguous spectrum not requiring aggregation. A CP-based OFDM transmission scheme may also lead to a downlink physical layer for 5G that is similar to that of legacy systems (e.g., modifications to pilot signal density and location).

Other waveform candidates may be considered for flexible 5G networks (5gFLEX), however conventional OFDM remains a possible candidate for 5G systems, e.g., for the downlink transmission scheme. In some cases, 5gFLEX radio access may be characterized by a very high degree of spectrum flexibility that enables deployment in different frequency bands with different characteristics. 5gFLEX may include different duplex arrangements and different and/or variable sizes of the available spectrum, including contiguous and non-contiguous spectrum allocations in the same or different bands. 5gFLEX may also support variable timing aspects, such as support for multiple TTI lengths and/or support for asynchronous transmissions.

Both TDD and FDD duplexing schemes may be supported in 5gFLEX. For FDD operation, supplemental downlink operation may be supported using spectrum aggregation. FDD operation may support both full-duplex FDD and half-duplex FDD operation. For TDD operation, the DL/UL allocation may be dynamic (i.e., it may not be based on a fixed DL/UL frame configuration). For example, the length of a DL or a UL transmission interval may be set per transmission opportunity.

In some cases, increased path-loss at higher frequencies (e.g., greater than 6 GHz) may be compensated for using beamforming. In some cases, a plurality (e.g., a relatively larger number) of antenna elements may be used to achieve higher beamforming gain.

In some cases, implementation cost may be reduced (e.g., by reducing the number of RF chains) using analog and/or hybrid beamforming. Analog and/or hybrid beams may be multiplexed in time. Beamforming may be applied to one or more of sync, PBCH, and control channels to provide cell wide coverage. The term beam sweep may refer to transmission and/or reception of beamformed channels multiplexed in time and/or frequency and/or space.

The term reference signal may refer to any signal, preamble, or system signature that may be received and/or transmitted by the WTRU for one or more of the purposes described herein. Different reference signals may be defined for beam management in the DL and UL. For example, DL beam management may use a channel state information reference signal (CSI-RS), demodulation reference signal (DMRS), a synchronization signal (SS), or other suitable signal. UL beam management may use sounding reference signal (SRS), DMRS, preamble transmission associated with a random access channel (RACH), or other suitable signal.

After receiving a reconfiguration message implicitly or explicitly associated with a condition (i.e., a conditional reconfiguration), a WTRU may verify and store the reconfiguration, may start to monitor a condition (i.e., a trigger condition) and may apply the reconfiguration when the trigger condition is satisfied. For example, the WTRU may receive a radio resource control (RRC) Connection Reconfiguration with one or more of a Mobility Information Element and a Conditional Mobility Information Element. The WTRU may receive one of the information elements one per candidate target cell. The WTRU may be configured with multiple conditional reconfigurations associated with multiple target cells. A conditional reconfiguration can also be referred to as a conditional handover (CHO), and these terms are used interchangeably herein.

Decoupling a reconfiguration transmission from an application of the reconfiguration may improve the reliability of the control signaling. For example, control signaling may be sent when the quality of the radio link is better. Another benefit of this approach may be a shorter reaction time between an impairment event (e.g., measurements) and a corrective action (e.g., a reconfiguration with mobility). In legacy methods, the WTRU may first need to detect the impairment event, report the event to the network, wait for network response, and process the network response to take corrective action. Such delays may hinder execution of a mobility reconfiguration at the right time under rapidly degrading radio conditions. Conditional reconfiguration, in contrast, may facilitate the WTRU in benefitting from controlled autonomy. In such cases, the network may configure how to detect an impairment event and what corrective action to perform, whereas the WTRU may determine when to perform the corrective action. This may enable faster reaction times, which may facilitate sparse transmission and/or measurement of reference signals and may increase power savings at the network and/or the WTRU.

A cell may be configured with a supplementary uplink (SUL). An SUL may extend the coverage of a WTRU operating in a high frequency by switching the UL to a lower band if the WTRU is far from the gNB. In some cases, the SUL may include a cell with a DL carrier associated with two separate UL carriers. In some implementations, the separate UL carriers may include a regular UL (RUL), which may be in the high frequency band (e.g., where the DL carrier is also located) and a SUL, which may be in a lower frequency band.

A SUL may be configured for both a primary cell (PCell) (e.g., in NR standalone mode) and for a PSCell in NR-NR DC or in dual connectivity between LTE and NR (i.e., non-standalone (NSA) mode or NR DC (EN-DC)). The WTRU may perform initial access to a cell using either RUL or SUL. The SUL configuration may be broadcast in minimum SI by a cell. The WTRU may select the SUL for initial access if the DL quality of the serving cell is below a threshold.

In some cases, a plurality of separate operating modes are possible for SUL if a WTRU is RRC connected (e.g., in a RRC_CONNECTED state). In an example operating mode, the RRC may configure the WTRU with two ULs, one of which is a full UL configuration and the other of which is an SRS configuration. If a full UL configuration is provided for a carrier, then the WTRU may perform UL control, UL data, SRS, PRACH etc. If only a SRS configuration is provided for a carrier, then the WTRU may only perform SRS transmission. In this example mode of operation, the WTRU may use the fully configured UL configuration for all control and data transmission in the uplink, and may transmit SRS on the other non-fully configured uplink. RRC reconfiguration may be used to provide a full UL configuration for a different carrier and may be used to switch between UL data between different ULs. In another example operating mode, the RRC may configure two ULs, both of which are fully-configured ULs. In some implementations, signaling (e.g., MAC CE, or DCI) may enable the WTRU to switch between the two UL configurations. In another example operating mode, the RRC may configure two ULs, both of which are used. This operating mode assumes that PUSCH transmission for a single serving cell cannot occur simultaneously for both ULs.

As described above, NR interfaces may support a wide range of use cases with varying service requirements. For example, mMTC use cases may require low overhead and low data rate power efficient services. URLLC use cases may require very high reliability. Enhanced mobile broadband (eMBB) use cases may require high data rates. NR interfaces may support diverse WTRU capabilities, such as low power, low bandwidth WTRUs, WTRUs capable of very wide bandwidth (e.g., 80 Mhz) transmissions, and WTRUs that use high frequencies (e.g., above 6 Ghz). In such use cases, WTRUs may be in various mobility scenarios (e.g., stationary/fixed, high speed trains, etc.). The NR interface may require an architecture that is flexible enough to adapt to diverse deployment scenarios (e.g., standalone, non-standalone with assistance from a different air interface, centralized, virtualized, and distributed over ideal/non-ideal backhaul).

Frequent handover failures and/or radio link failures may occur in such scenarios. For example, such failures may be attributed to the quality of a serving cell dropping rapidly within a short period of time. Methods and devices which may overcome these issues and improve the reliability of control signaling are described herein.

A WTRU may perform a reestablishment procedure to recover from a critical error condition that affects operation in the serving cell. However, the reestablishment procedure may come with a cost of increased interruption times and dataloss. Enhanced reestablishment procedures may be provided to facilitate acceptable interruption times in critical error scenarios.

Figure 2:
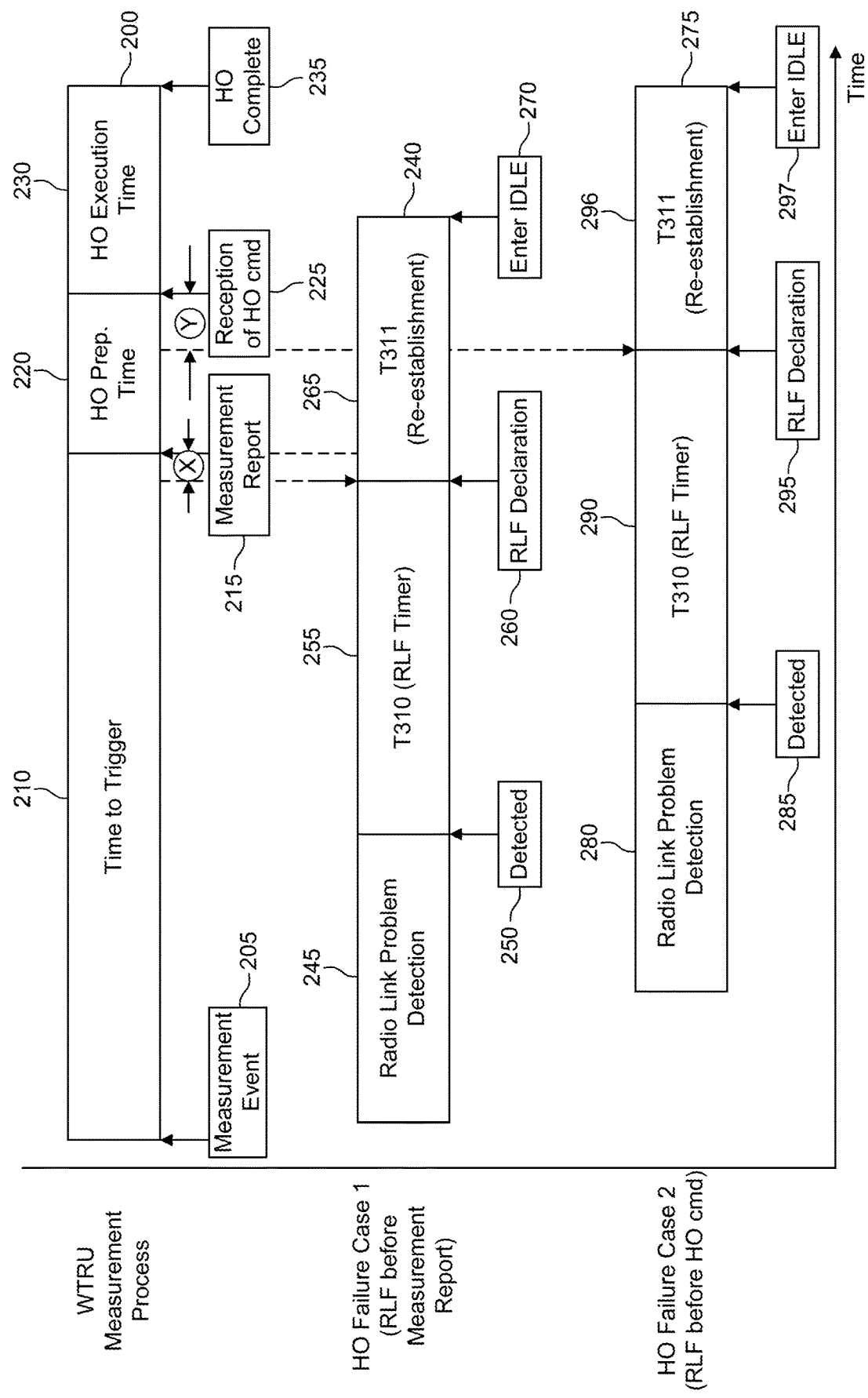
FIG. 2 is a diagram illustrating handover failure causes associated with mobility signaling issues.

FIG. 2 is a diagram illustrating handover failure causes associated with mobility signaling issues. Before a handover command (HOC) is received by a WTRU, radio link conditions may deteriorate quickly within the source cell and radio link failure (RLF) may be declared. The WTRU may perform reestablishment towards the target cell. The HOC may not be received on time for one or more reasons. The WTRU may have not transmitted the measurement report early enough (e.g., while suitable neighbor cells are available) due to uplink radio link degradation. The WTRU may have not received the handover command due to downlink radio link degradation. Reestablishment and service interruption may be avoided if, prior to declaring RLF, the WTRU receives a handover command for a suitable target cells while the link with the source cell have not yet failed.

FIG. 2 is a diagram illustrating handover failure cases associated with mobility signaling issues. Measurement process 200 of the WTRU begins when a measurement event 205 is detected by the WTRU. After a time interval 210 (e.g., tracked by a timer of the WTRU), the WTRU transmits a measurement report 215 to the network (e.g., to or via a gNB). After the measurement report is sent to the network, the WTRU waits for a period of time 220 while the network prepares a handover command 225. After the WTRU receives handover command 225, it executes a handover based on handover command 225. The handover takes an execution time 230. From the perspective of the WTRU, handover completion 235 may occur, e.g., when a RACH is completed in the target cell of the handover.

Example RLF 240 illustrates an example handover failure case where an RLF occurs before the WTRU is able to transmit measurement report 215. In this example, the WTRU detects radio link problems (e.g., when a maximum number of out-of-sync indications are received from lower layers). during time interval 245. After detection 250 of a radio link problem, the WTRU waits for a time interval 255 (e.g., to exclude transient problems, e.g., tracked with a RLF timer such as T310) before declaring an RLF 260. Because the WTRU has determined that the radio link with the network has failed before it would have transmitted measurement report 215 (time X), the WTRU does not transmit measurement report 215, and instead attempts to reestablish its connection with the network for a time interval 265 (e.g., tracked with a timer such as T311). If the WTRU is unable to reestablish its connection within time interval 265, it enters an idle state 270.

Example RLF 275 illustrates an example handover failure case where an RLF occurs after the WTRU transmits measurement report 215, but before it receives handover command 225. In this example, the WTRU detects radio link problems (e.g., e.g., when a maximum number of out-of-sync indications are received from lower layers.) during time interval 280. After detection 285 of a radio link problem, the WTRU waits for a time interval 290 (e.g., to exclude transient problems, e.g., tracked with a RLF timer such as T310) before declaring an RLF 295. Because the radio link with the network has failed before the WTRU is able to receive the handover command 225 (time Y), the WTRU does not perform the handover, and instead attempts to reestablish its connection with the network for a time interval 296 (e.g., tracked with a timer such as T311). If the WTRU is unable to reestablish its connection within time interval 296, it enters an idle state 297.

Legacy RRC reestablishment may result in increased latency and interruption time for active services at the WTRU. The RRC reestablishment procedure may include WTRU based mobility that is triggered based on one or more conditions (e.g., critical error conditions) such as a radio link failure (e.g., a RLF timer (e.g., T310) expiry), a random-access failure, a maximum number of radio link control (RLC) retransmissions, an integrity check failure, etc. However, initiation of a RRC reestablishment procedure may result in suspension of data radio bearers (DRBs). In some embodiments, the DRBs may not resume until the WTRU receives a first RRC reconfiguration from the network after completion of reestablishment procedure to a target cell. The interruption time from DRB suspension to resumption may be quite large, which may result in dataloss.

In some embodiments, the WTRU may determine whether a reestablishment procedure or a conditional reconfiguration procedure should be initiated as a function of an impairment event. The WTRU may be configured to monitor for various events that result in impairment to operation in the serving cell. An impairment event may include, for example, one or more of a lower layer problem indication from radio link monitoring (RLM) process (e.g., a RLF timer (e.g., T310) expiry), a random-access problem indication, an indication that maximum RLC retransmission has been reached, an indication that beam recovery is failed and/or no candidate beam is found, a reconfiguration failure (e.g., the WTRU cannot comply with a received reconfiguration command), integrity check failure, a handover failure, etc. The WTRU may be configured to determine whether to perform a reestablishment procedure or a conditional reconfiguration procedure after detection one or more of such impairment events. The determination may be made as a function of a specific impairment event or type of impairment event.

In some embodiments, the WTRU may perform a conditional reconfiguration procedure after detecting a first subset of impairment events if the WTRU is configured with a conditional reconfiguration for any target cell (i.e., a suitable target cell exists—there is at least one target cell for which a conditional reconfiguration exists) and the target cell satisfies a cell selection criteria (e.g., the quality of the target cell is above a predefined threshold). The first subset of impairment events may include one or more of an indication of a lower layer problem from a RLM process (e.g., T310 expiry), an indication of a random-access problem, an indication that maximum RLC retransmission has been reached, an indication that beam recovery is failed and/or no candidate beam is found, etc.

In some embodiments, the WTRU may perform a reestablishment procedure after detecting a second subset of impairment events. The second subset of impairment events may include one or more of a reconfiguration failure (e.g., the WTRU receives a handover command, but cannot comply with the contents of the handover command), integrity check failure, and handover failure. The WTRU may also perform a reestablishment procedure after detecting the first set of impairment events if the WTRU is not configured with a conditional reconfiguration for any target cell (i.e., no suitable target cell exists) or when no target cells associated with a conditional reconfiguration satisfy the cell selection criteria.

In some embodiments, a WTRU may initiate a handover procedure if reestablishment is triggered towards a cell for which a conditional reconfiguration exists (i.e., the WTRU is configured with a conditional reconfiguration with that cell as a target). The WTRU may be configured with conditional reconfiguration towards one or more target cells. While the WTRU is monitoring for trigger conditions associated with the target cells, an impairment event, such as the first or second set of impairment events described above, may be detected by the WTRU. The WTRU may trigger a reestablishment procedure based on the detected impairment event.

The reestablishment procedure may include performing cell selection to select a suitable cell. In one example, as the outcome of cell selection, the WTRU may select a cell for which a conditional reconfiguration exists (e.g., the WTRU has received a conditional reconfiguration for the cell that has not expired). If the WTRU selects a cell for which a conditional reconfiguration exists, the WTRU may assume that the trigger condition is satisfied towards that cell (i.e., the WTRU may trigger a conditional handover instead of a reestablishment procedure). In another example, if, as the outcome of the cell selection, the WTRU selects a cell for which a conditional reconfiguration does not exist, (e.g., all conditional reconfigurations for the cell have expired or no conditional reconfiguration has been configured for the cell), then the WTRU may trigger a reestablishment procedure. This scheme may be beneficial to reduce the interruption time in some cases, as the DRBs may be resumed after the WTRU sends reconfiguration complete in case of a conditional handover. Additionally, the WTRU may be configured with the dedicated random access resources for conditional reconfiguration which further reduce the latency/interruption time.

During the cell selection procedure, the WTRU may prioritize cells configured for conditional handover (i.e., the WTRU has received a conditional handover configuration indicating the cell as a target cell). For example, the WTRU may be configured to add a positive offset (i.e., a positive bias when evaluating cell selection criteria; e.g., a positive bias to an RSRP or RSRQ measurement) for the target cells for which a conditional reconfiguration exists (i.e., the WTRU has received a conditional handover configuration indicating the cell as a target cell). Alternately, the WTRU may be configured to select a target cell for which a conditional reconfiguration exists if the quality (e.g., RSRP or RSRQ value) of the target cell is above a predefined threshold.

The WTRU may be configured with a conditional reconfiguration for more than one target cell. The WTRU may be configured with further rules to prioritize a target cell among the plurality of target cells. For example, the WTRU may prefer target cells with highest priority (or a relatively higher priority). In some embodiments, the priority may be explicitly configured by the network as a part of conditional reconfiguration. In some embodiments, the priority may be implicitly determined by the WTRU based on the trigger condition, such as target cells whose offset/thresholds are smaller compared to serving cell. For example, the WTRU may be configured to trigger conditional handover to whichever of the plurality of target cells has a RSRP or RSRQ value exceeding that of the serving cell by a threshold amount, or by the greatest amount. The WTRU may prefer target cells to which dedicated random access preambles have been allocated. The WTRU may prefer target cells with SUL configuration. The WTRU may prefer the most recently configured target cell or cells, or target cells with highest valued validity timer (e.g., having the longest remaining validity).

As discussed above, a conditional handover (CHO) or enhanced reestablishment procedure may be triggered by the detection of lower layer problems. Lower layer problems that trigger a CHO may be associated, for example, with one or more of following events: T310 expiry, RA access problem indication from MAC while T300, T301, T304, T311 are not running, or indication from RLC that maximum retransmissions has been reached. T300 is a timer which, while running, indicates that the WTRU is engaged in an ongoing RRC connection setup procedure. T301 is a timer which, while running, indicates that the WTRU is awaiting a reestablishment response. T304 is a timer which, while running, indicates that the WTRU is engaged in an ongoing handover procedure. T300 is a timer which, while running, indicates that the WTRU is engaged in an ongoing reestablishment procedure.

A WTRU may be configured with a timer and/or radio link failure (RLF) related parameter values (e.g., maximum number of transmissions and N3xx values, where N310 is a counter which tracks a number of out-of-sync indications from lower layers, and N311 is a counter which tracks a number of in-sync indications from lower layers. T310 is started if N310 exceeds a threshold, and T310 is stopped if N311 exceeds a threshold), or offsets thereof, that may trigger RLF. The parameters may be the same as or similar to parameters typically used in the monitoring function (e.g., RLM, HARQ, etc.). For example, a WTRU may be configured with values that may trigger a conditional mobility or an enhanced reestablishment procedure before the WTRU would otherwise determine that a radio link failure has occurred. In some implementations this may avoid triggering the procedure for RLF and reestablishment.

CHO triggering based on detection of lower layer problems may depend on the SUL configuration. For example, if a WTRU configured with CHO is configured with SUL in the serving cell, the WTRU may perform CHO only if T310 expires. Otherwise, the WTRU may perform CHO if a trigger for RLF associated with any cause (e.g., indication of RLM problems, maximum number of HARQ retransmissions, RACH failure, etc.) occurs. For example, the WTRU may consider an occurrence of a beam failure recovery as a trigger.

If the WTRU is configured with an SUL and unsuccessfully attempts a RA procedure on the RUL, the WTRU may indicate a random-access problem to higher layers. After this indication is received by RRC (e.g., upon receipt), the WTRU may start a timer and may perform a RA procedure on the SUL if the measured DL reference signal receive power (RSRP) is below a threshold. If the RA procedure on SUL is successful, the WTRU may transmit an indication to the RRC layer. The WTRU may stop the timer upon or after reception of an indication from MAC layer of successful RA procedure on the SUL. Upon or after this timer expiry, the WTRU may perform CHO.

If the WTRU is configured with an SUL, the WTRU may report master cell group radio link failure (MCG-RLF) information through the SUL link when RLF is triggered instead of initiating reestablishment. The WTRU may trigger handover on the best cell that has CHO. The MCG-RLF report may include the latest measurements of the target cells that triggered a CHO, or the best cells among these. The source gNB may transmit these results to the target cell. The target cell may release contention free random access (CFRA) resources associated with the beams having a RSRP lower than a configured threshold and an indication of the beams where the WTRU will most likely attempt a RA procedure. The target may also configure the WTRU with beams (e.g., CSI-RS configuration) with the highest reported measurement results.

After successful handover completion to a target cell, the target cell may send an indication of the successful handover completion to the source cell. Based on this indication, the source cell may notify the other prepared candidate cells to release the configuration associated with this WTRU (e.g. dedicated RACH resources). A CHO may be triggered based on the detection of lower layer problems in RRC_CONNECTED mode. A new timer for layer 1 problem detection, or an offset to T310, may be set to facilitate triggering a handover based on existing CHO commands at its expiry before RLF is triggered. A new timer in MAC, smaller than the beam failure recovery timer, or an offset to beam failure recovery timer, may be set to trigger a handover based on existing CHO commands before the indication of the expiry of T310 to the higher layers. A maximum number of preamble retransmissions, e.g., smaller than ra-PreambleTx-Max, or an offset to ra-PreambleTx-Max, may be set to trigger a handover before declaring RLF. A number of consecutive out-of-sync indications from the lower layers, smaller than N313, or an offset to N313 may be set to trigger a handover based on existing CHO commands before RLF is declared.

In some embodiments, CHO triggers are associated with multiple measurement quantities. For example, a WTRU may be configured with CHO trigger conditions associated with a specific measurement quantity. In some examples, the WTRU may be configured with a trigger condition involving more than one measurement quantity. The measurement quantity or quantities may include, for example, RSRP, reference signal received quality (RSRQ) and/or signal-to-interference plus noise ratio (SINR). An example of a trigger condition involving more than one measurement quantity may require both that a first measurement quantity of a candidate cell is better than the serving cell or a first absolute threshold, and that a second measurement quantity of the candidate cell is better than the serving cell or a second absolute threshold. Different combinations of first and second measurement quantities may be possible. For example, RSRP and RSRQ, RSRP and SINR, RSRQ and SINR and so forth. In some examples, the WTRU may be configured with a trigger condition involving more than two measurement quantities; e.g. RSRP, RSRQ and SINR, and so forth.

For cases where multiple cells satisfy trigger conditions at the same time, the WTRU may be configured to prioritize a target cell based on a measurement quantity associated with trigger conditions. For example, the WTRU may be configured to prioritize a candidate cell having the highest SINR. In another example, the WTRU may be configured to prioritize a candidate cell having the highest RSRQ. In some examples, the WTRU may be configured with priorities associated with the trigger conditions, such that certain trigger conditions are prioritized over others. For example, the WTRU may be configured to prioritize trigger conditions based on SINR and/or RSRQ over RSRP-based trigger conditions.

In some embodiments, CHO triggers are associated with multiple reference signal types. For example, a WTRU may be configured with CHO trigger conditions based on measurements associated with a specific RS type. The RS type may be SSB or CSI-RS, for example. In some examples, the WTRU may be configured with multiple trigger conditions, each involving more than one reference signal type. For example, the WTRU may be configured with one trigger condition based on a measurement associated with SSB, and another trigger condition based on a measurement associated with CSI-RS. Such trigger conditions may be associated with the same or different candidate cells and/or frequencies.

For cases where multiple cells satisfy trigger conditions at the same time, the WTRU may be configured to prioritize a target cell based on the reference signal type associated with each trigger condition. For example, the WTRU may be configured to prioritize candidate cells having the highest number of good beams based on SSB. In this context, a good beam may refer to a beam associated with an SSB whose RSRP is above a preconfigured threshold (e.g., RSRP-Threshold-SSB). In another example, the WTRU may be configured to prioritize candidate cells having the highest number of good beams based on CSI-RS. In this context, a good beam may refer to a beam associated with a CSI-RS whose RSRP is above a preconfigured threshold (e.g., RSRP-threshold-CSI-RS). In some examples, the WTRU may be configured to determine which reference signal type to prioritize based on type of service. For example, if the WTRU is configured to prefer reliability, then the WTRU may prioritize trigger conditions associated with SSB as RS type. Similarly, if the WTRU is configured to prefer lower latency or higher throughput, then the WTRU may prioritize trigger conditions based on CSI-RS as RS type.

Some embodiments include implicit and/or default CHO candidates. In some cases, implicit configuration of CHO candidates may facilitate reduction of RRC signaling overhead. In some implementations, a WTRU may assume cells having specific properties as CHO candidates by default. For example, the WTRU may consider all secondary cells (Scells) that are configured for the WTRU as implicit CHO candidates. In another example, the WTRU may consider only those Scells that are activated as implicit CHO candidates. In another example, the WTRU may be configured during Scell addition or modification as to whether the Scell should be considered as a default CHO candidate. In another example, a WTRU may assume that a primary Scell (PScell) is an implicit CHO candidate. In another example, a WTRU may consider any cell in the SCG as an implicit CHO candidate. In another example, a WTRU may be configured during SCG addition or modification, or cell group configuration, as to whether the Scell should be considered as a default CHO candidate. In another example, a WTRU may be configured to prioritize implicit CHO candidates during CHO execution (e.g., over explicit CHO candidates).

Some embodiments include a priority associated with the trigger conditions. In some embodiments, a WTRU may be configured with one or more candidate cells for CHO, and each candidate cell may be associated with one or more trigger conditions, leading to multiple trigger conditions for execution of a CHO. It may happen that more than one of the trigger conditions is satisfied at a given time. In some examples, the WTRU may be configured with rules to determine to which target cell to CHO when these satisfied trigger conditions are associated with different candidate cells. Example rules may include a prioritization, or a combination of prioritizations, based on the best beam, based on the number of good beams, and/or based on availability of a dedicated resource. For prioritization based on the best beam, the WTRU may be configured to select a candidate cell with the best beam relative to the WTRU (e.g., in terms of RSRP, RSRQ or SINR). For prioritization based on the number of good beams, the WTRU may be configured to select a candidate cell with the highest number good beams relative to the WTRU, wherein the good beam may be defined in terms of measurement quantity above a preconfigured threshold (e.g. RSRP, RSRQ or SINR). For prioritization based on availability of dedicated resource to the WTRU, the WTRU may be configured to select a candidate cell having the availability above a minimum threshold (e.g., in terms of RSRP, RSRQ or SINR) and which is associated with a usable dedicated resource (e.g. CFRA). Alternately the WTRU may be configured to select a candidate cell with highest number of CFRA resources associated with good beams.

In some examples, the WTRU may be configured to prioritize the reliability of the CHO. For example, the WTRU may be configured to choose a cell having the best cell quality and/or beam quality from among the candidate cells. In some examples, the WTRU may be configured to prioritize the latency of the CHO. For example, the WTRU may choose a cell with a usable CFRA resource from among the candidate cells. The term usable indicates that the beam (i.e., the reference signal) associated with the CFRA resource configuration meets a minimum threshold (e.g., in terms of RSRP, RSRQ, and/or SINR).

Some embodiments implement CFRA validity in the target cell as function of the serving beam in the source cell. Some embodiments provide a CHO command which indicates CFRA resources that are activated based on the serving beam in the source cell. For example, the WTRU may receive a CHO command which includes multiple configurations of dedicated RACH resources for some or all SSB/CSI-RS in the target cell. Further, the WTRU may be configured with an association between the serving beam and a group of beams in the target cell. In some examples, the WTRU may only select a beam with CFRA in the target cell if it is associated with the serving beam (or best beam) in the serving cell.

The serving cell signals which beam to use (e.g., for physical downlink control channel (PDCCH) monitoring or DL data) using a target cell identifier (TCI) state. The indication of CFRA resources that are activated based on serving beam in the source cell may be based on the TCI state. For example, when the WTRU executes the handover command in the target cell, it may only consider the CFRA resources for beams in the target cell that are linked to the beam indicated in the TCI state. The WTRU may be configured to assume that only the CFRA resources in target cell beams that are linked to the current serving cell beams (i.e., based on TCI state) are valid. This implicit activation of CFRA resources based on preconfigured linkage may have the advantage of minimizing frequent signaling.

Figure 3:
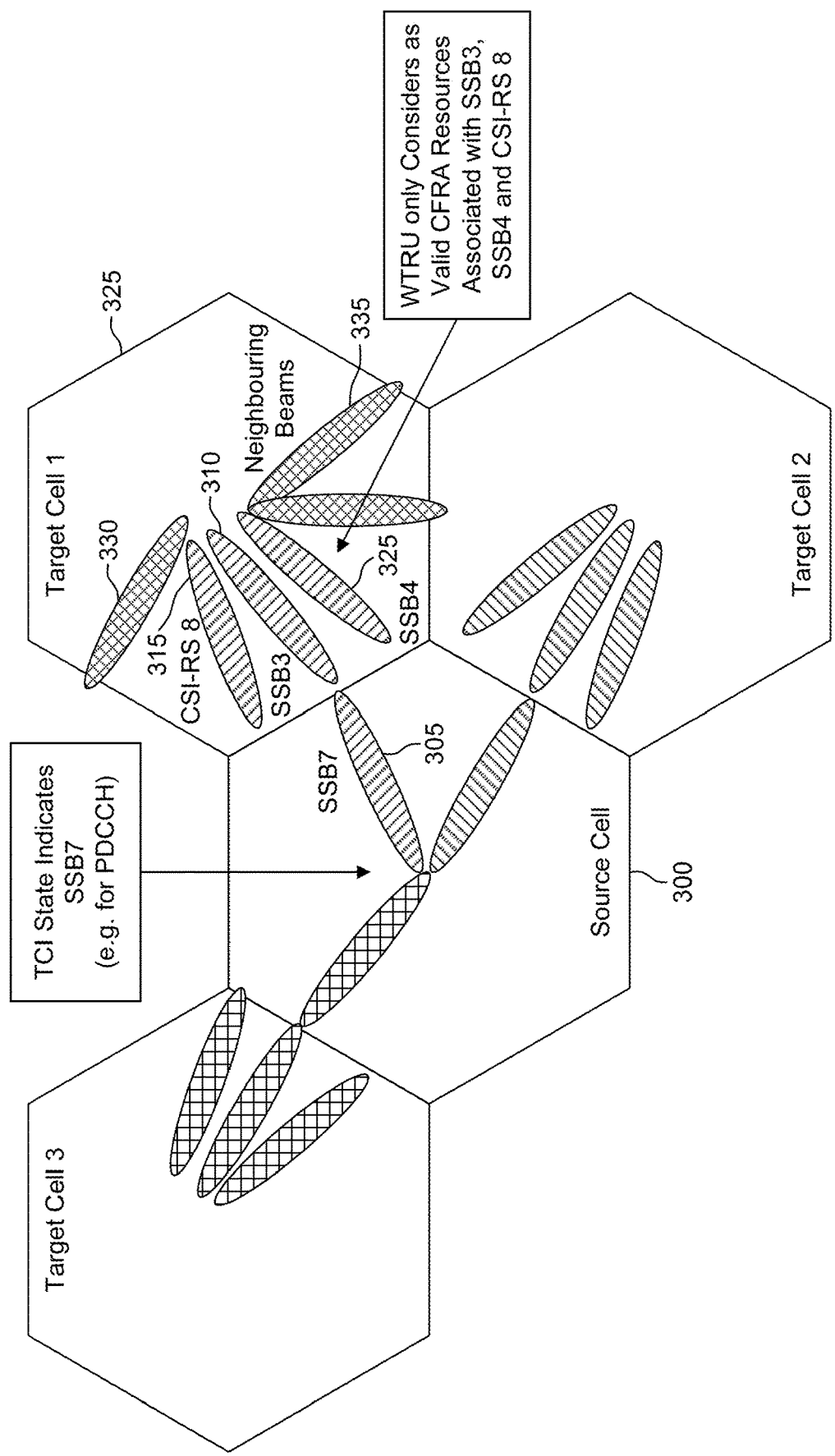
FIG. 3 is a cell diagram which illustrates CFRA resources activated based on their association with a serving beam in a source cell.

FIG. 3 is a cell diagram which illustrates CFRA resources activated based on their association with a serving beam in a source cell 300. In FIG. 3, a WTRU in source cell 300 is configured with an association between serving beam 305 and beams 310, 315, and 320 in a first target cell 325. If the WTRU executes the CHO in target cell 325, only CFRA resources for beams 310, 315, and 320 are activated, based on their association with serving beam 305, which is indicated in the TCI state. CFRA resources for beams 330 and 335 are not activated, as they are not associated with serving beam 305.

Since the timing of a conditional reconfiguration may be determined by the WTRU, the RRC configuration used by the WTRU at the target cell may be ambiguous and lead to handover failure.

Figure 4:
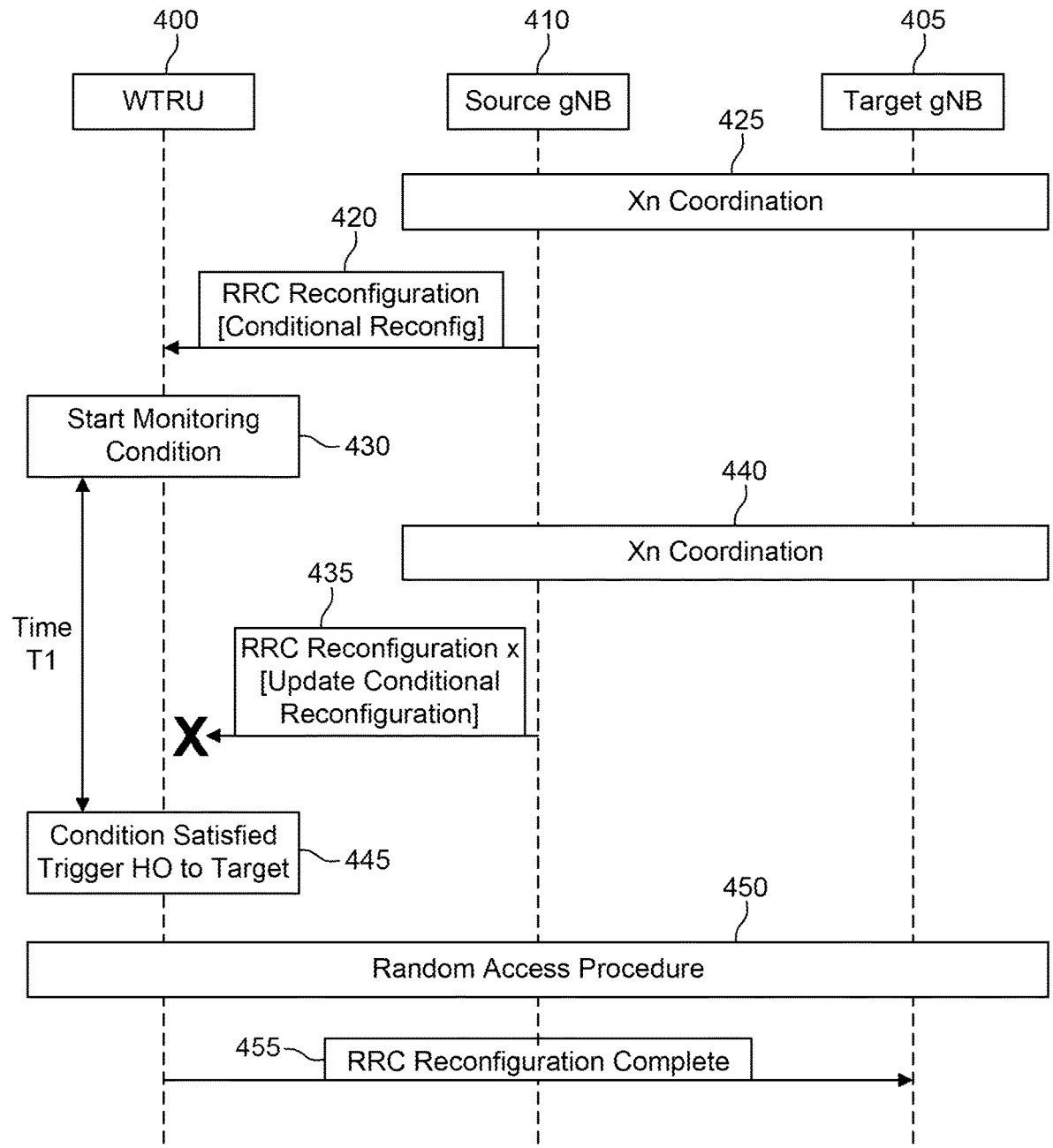
FIG. 4 is a message sequence chart illustrating a configuration mismatch scenario.

FIG. 4 is a message sequence chart illustrating an example configuration mismatch scenario. In the example of FIG. 4, a WTRU 400 may initially receive a conditional reconfiguration 420 for a target gNB 405 from a source gNB 410. Source gNB 410 may determine conditional reconfiguration 420 based on coordination 425, which may take place over an Xn interface. The Xn coordination 425 may be based on handover preparation signaling. Conditional reconfiguration 420 may include various parameters, including a trigger condition and the RRC configuration to be applied at the target cell associated with target gNB 405 if the trigger condition occurs. In some implementations, the parameters may include a logical identifier, associated with the target cell RRC configuration. WTRU 400 may start monitoring the trigger condition during time T1 in step 430. During time T1, the WTRU may still be connected to the serving cell associated with source gNB 410, and may receive different kinds of RRC signaling from the source gNB 410. Such RRC signaling from the source gNB 410 may affect the stored conditional reconfiguration 420 at the WTRU 400, thus affecting the WTRU 400 configuration to be applied in the source cell associated with source gNB 410. The source gNB 410 may also need to coordinate with target gNB 405 whenever the WTRU's conditional configuration 420 applicable to the target operation is updated. For example, Source gNB 410 may need to coordinate both WTRU 400 and target gNB 405 such that the RRC configuration 420 is consistent between the WTRU and target gNB.

Since the timing of conditional reconfiguration is decided by the WTRU, there may be cases where WTRU autonomously triggers handover while a reconfiguration with the source cell is ongoing. This may result in a configuration mismatch at the target cell, resulting in failure of handover procedure. In other words, the target gNB may be uncertain about the RRC configuration last used in the source cell. For example, WTRU 400 may receive one or more reconfigurations in the source cell during time T1. It may not be obvious to the target gNB whether the WTRU may or may not have received/applied those reconfigurations before triggering CHO. In this example, source gNB 410 determines an update 435 to conditional reconfiguration 420 based on coordination 440 over an Xn interface, and transmits update 435 to WTRU 400. Update 435 may include one or more changes to the parameters in conditional reconfiguration 420 (e.g., different target cell RRC configuration, different RACH configuration, different radio bearer configuration, different security configuration, different condition or conditions, etc.) If the parameters of conditional reconfiguration 420 include an identifier (e.g., an ID number), update 435 will include a different identifier. WTRU 400 does not receive update 435, as illustrated in FIG. 4. In step 445, WTRU 400 determines that the trigger condition indicated in conditional reconfiguration 420 has been satisfied, and initiates a random access procedure 450 with target eNB 405. Here, a configuration mismatch has occurred, in that WTRU 400 triggered random access procedure 450 based on conditional reconfiguration 420, and not based on update 435.

A WTRU may transmit an indication of its configuration associated with the target cell. For example, the WTRU may be configured to transmit an indication of its RRC configuration associated with the target cell. The indication may be sent in a first message after random access procedure in the target cell. The indication may be sent along with the first RRC message in the target cell. The indication may include an identity associated with the conditional reconfiguration message applied by the WTRU (e.g., the identifier, ID number, or other parameter as discussed above). For example, the indication may include a transaction identifier corresponding to the latest RRC reconfiguration message containing the conditional reconfiguration message associated with the target cell. The indication may be an identity associated with the last used RRC configuration in the source gNB. For example, the indication may be a transaction identifier corresponding to the latest RRC reconfiguration message successfully received and applied by the WTRU in the source gNB.

The WTRU may be configured to transmit the indication in a MAC CE along with the initial RRC message. For example, the initial RRC message may be both ciphered and integrity protected using the configuration indicated by the MAC CE. The WTRU may be configured to transmit the indication within a RRC message. For example, the WTRU may transmit the indication as a part of transaction identifier in RRC reconfiguration complete message. The RRC message may only be integrity protected.

For a RRC reconfiguration procedure involving serving cell, a WTRU may transmit a RRC reconfiguration complete message to the source cell. For a RRC reconfiguration procedure involving mobility, the WTRU may not transmit a RRC response message to the source cell, but may transmit RRC a reconfiguration complete message to the target cell. For example, in FIG. 4, WTRU 400 transmits reconfiguration complete message 455 to target gNB 405 after random access procedure 450. This may be desirable since the WTRU stops source cell transmission after receiving RRC reconfiguration message with mobility. Reconfiguration complete message 455 may include the identity associated with the conditional reconfiguration message applied by the WTRU (e.g., the identifier, ID number, or other parameter) as discussed above.

In the case of a conditional reconfiguration involving mobility, the WTRU may stay in the source cell after receiving the RRC reconfiguration message. Unlike a regular RRC reconfiguration with mobility, the WTRU may be required to acknowledge the successful reception of conditional reconfiguration to the source cell.

The WTRU may be configured to transmit two response messages in response to a conditional reconfiguration message. The WTRU may be configured to transmit a first message to the source cell upon reception of conditional reconfiguration involving mobility. The WTRU may be configured to transmit a second message to the target cell upon execution of the conditional reconfiguration involving mobility. The first message may be a MAC control element with a predefined logical channel identification (LCID). The MAC CE may indicate a transaction identifier of the corresponding RRC message containing the conditional reconfiguration. The first message may be a RRC response message indicating the successful reception of conditional reconfiguration message. If the WTRU cannot comply with the conditional reconfiguration, the WTRU may send a failure cause in the RRC response message. The second message may be a RRC reconfiguration complete message.

Measurements may be sent too late, which may not permit to the network to prepare and send a handover command in time. The time to trigger the measurement may be function of the radio link quality in the source cell. For example the time to trigger (TTT) may be function of one or more of the following: the block error ratio (BLER) of the resources configured for radio link monitoring, the number of out of synch (OOS) instances, the number of beam failure instances detected in the source cell, the serving cell quality (RSRP, RSRQ, SINR), the quality of the best beam in the source cell or based, and the RS provided for the active TCI state for PDCCH.

The configured time to trigger a measurement object may be ignored and the measurement report immediately transmitted by the WTRU when some conditions on the measurement results or the radio link in the source cell are met. For example, when measurement events conditions have been satisfied, the WTRU may transmit the measurement report available as soon as the RLF timer starts.

The TTT of a measurement report may be function of the propagation conditions experienced by the WTRU in the serving cell in the previous periods of time. The TTT may be function of the number of RLF timer start instances in the past periods of time. For example, if a RLF timer has started at least "x" times in the "y" previous period of time, the WTRU may apply a lower TTT. The values "x" and "y" may be configurable.

When a WTRU detects a radio link problem while a recently reported measurement is still valid, the WTRU may notify the network in order to take an action (e.g. prepare and transmit a handover command) based on the results of the previously transmitted measurements report.

The trigger for the indication transmission may be based on any of the previously described conditions.

The validity of the measurement results and the subsequent decision to transmit the indication of radio link issues to the NW may be determined by the WTRU. The decision to transmit this indication may be based on whether the previous measurement report transmitted to the NW is still valid.

The validity of the measurement results may be determined by the WTRU based on whether the target cell that triggered the report is still satisfying the measurement report condition at the time the WTRU needs to transmit the indication.

The evaluation of this condition may be based on layer 1 measurement. Layer 3 filtering may not be applied in order to transmit the indication as early as possible.

The validity of the measurement results may be determined based on the elapsed time between the last report and the moment the WTRU needs to transmit the indication. If multiple measurement reports have been transmitted recently and only a subset of target cells is still suitable for handover, the WTRU may include in the indication the identity of the suitable target cells.

For example, an event may have triggered a report recently, but the network may not have decided to hand off the WTRU towards the target cell (e.g., because serving cell is still sufficiently strong). If the WTRU starts experiencing radio link problems while it measures that the target cells that triggered the most recent measurement report is still satisfying the reporting conditions, the WTRU may transmit an indication of the link deterioration and the validity of the previous measurement report.

If the WTRU measures a neighbor cell quality is x dB higher than the serving cell and the link with the serving cell suddenly deteriorates (e.g., based on RLM evaluation) regardless of whether the WTRU is configured with reporting events, the WTRU may transmit an indication as soon as one of the previous defined radio link failure triggers are attained. This indication may contain the identity of the best measured neighbor cell. This indication may contain the best beams IDs in the target cell.

The WTRU may be configured with multiple measurement objects associated with sets of CSI-RS and/or SSBs belonging to different bandwidth parts (BWPs). These measurement objects may be associated with a reporting configuration. The reporting configuration may further include a condition to report the measurement based on the radio link monitored in the current active DL BWP (i.e., L1 measurements) or the source cell measurement result (i.e., L3 measurements). The condition may be one of the triggers described above.

Some embodiments provide an update of beam measurement results for a delta CHO reconfiguration. Delta CHO reconfiguration refers to an incremental update to an existing CHO. For example, a delta CHO may indicate a different resource than an existing CHO. Some embodiments include transmission of beam ID and reception of delta CHO reconfiguration. For example, the WTRU may receive a CHO command for multiple target cells and may monitor the best beams associated with target cells.

In some examples, the WTRU may be configured with a measurement event that is triggered if the quality of the best beam or the average quality of a group of best beams in the target cell drops below a threshold. If the measurement event is triggered, the WTRU transmits a measurement report to the gNB. The measurement report may include a quality measurement (e.g., RSRP, RSRQ, or SINR) of all the beams in the target cell, an identification of a new best detected beam above a threshold, beam identities of the beams, or a combination of these. In response to the measurement report, the WTRU may receive a delta reconfiguration for the CHO command of the target cell which includes the new dedicated RACH resources for the target cell associated with the indicated beams.

If a WTRU is experiencing a radio link problem in the active UL-DL BWP pair and a measurement report is triggered based on the conditions described above, the WTRU may not be able to successfully transmit the report in the current active UL BWP. It also may not be able to receive the subsequent handover command in the active DL BWP. Accordingly, in some implementations, if the measurement report is triggered based on any of the criteria described above, the WTRU may autonomously switch its active UL/DL BWP to one of the RRC configured UL/DL BWP that is experiencing less constraining radio conditions.

In TDD, the WTRU may perform this switch based on the set of configured CSI-RS and/or SSB resources that it measures. In FDD, the WTRU may switch its active UL BWP based on an estimate path loss from measured DL reference signals (i.e., reference signals associated with measurement objects). The WTRU may switch both UL and DL BWPs or only one BWP based on the measurement results and path loss estimate.

After any BWP switching, the WTRU may transmit the measurement report to the NW. If applicable, the measurement report may also include the identity of the DL BWP where the WTRU has autonomously switched. The WTRU may receive a handover command in the new activated DL BWP or a DCI for BWP switching towards another DL/UL BWP based on the measurement reports received. No action may be taken if the measurement results associated with the new activated DL/UL BWPs are acceptable.

A WTRU may be configured a with a handover command comprising multiple configured UL and DL BWPs in the target cell. The WTRU may transmit the measurement reports associated to each BWP. When executing the handover command, the WTRU may perform measurements on reference signals and select the BWP associated to the best reference signal depending on the dedicated configuration associated to it.

For example, the WTRU may select a first active BWP first in an order of dedicated configuration, then in order of quality of the beams associated to each BWP. The WTRU may select the BWP associated with the best measured reference signal if this reference signal is associated with a dedicated configuration (i.e., CFRA resources), otherwise it may select the second-best BWP carrying the second best beam associated with dedicated PRACH resources, and so on.

Some embodiments include multiple CHO commands towards the same target cell id. For example, in some embodiments, multiple first active UL and DL BWPs are configured in the target cell-selection based on measurements. For example, the WTRU may receive multiple conditional reconfigurations commands towards the same target cell id but with different first active UL and DL BWP, which include different sets of candidate beams for RACH (synchronization signal block (SSB) and or channel state information reference signal (CSI-RS)). If the CHO execution conditions for a given target are satisfied (e.g., an Ax event), the WTRU may select the configuration based on, for example, the CHO command configured with the first active DL BWP where the best reference signals (SSB and/or CSI-RS) have been measured. Example events satisfying CHO execution conditions for a given target include Ax events, where A1 indicates that the serving cell has become better (e.g., in terms of RSRP or RSRQ or SINR with respect to the WTRU) than a threshold, A2 indicates that the serving cell has become worse than a threshold, A3 indicates that a neighbor cell has become better by an offset than a SpCell, A4 indicates that a neighbor cell has become better than a threshold, A5 indicates that an SpCell has become worse than a first threshold and a neighbor cell has become better than a second threshold, and A6 indicates that a neighbor cell has become better than an SCell by an offset.

Some embodiments include selection of the first active UL/DL BWP, or carrier in the target cell-selection based on RACH configuration. For example, the WTRU may select a CHO command configured with the first active UL BWP (and a paired DL BWP) configured with a CFRA resource or resources associated with the best measured DL beam or beams. The WTRU may be configured with multiple uplink carriers in the target cell associated with different CFRA resources, and the WTRU may select the carrier to perform RACH based on the earliest availability of CFRA resource; e.g., from among carriers that are above a minimum quality threshold.

Handover failure may occur if the handover command is transmitted or received too early or too late. Measurements that may indicate, to the NW, the exact path of the WTRU and the evolution of the mobility associated to it in the source cell and in the target cell may assist the NW in the transmission of the handover command with suitable timing.

A new type of measurement events may be associated with the gradient of measurements in the source and the target cell. For example, a measurement report may be triggered if the source cell quality has decreased by at least "x" db during the past "y" periods of time while a quality of a neighbor cell has increased by at least "z" db during the past "y" periods of time. This may give an indication to the NW that the WTRU is moving away from cell A and approaching cell B, while also informing the NW about the radio link condition experienced in both cells.

When a target cell satisfies the criteria described above, it may trigger periodic measurement reports of the target cell results (e.g., with a high periodicity) in order to assist the NW in the configuration and transmission of the handover command and the target cell to prepare dedicated beams for RACH.

Another reason for handover failure may be that during the random-access procedure in the target cell, either the gNB is not able to decode the UL signals (e.g., msg1, msg3) or the WTRU is not able to the decode the DL signals in the PDCCH (e.g., msg2, msg4). If the WTRU is capable of monitoring the PDCCH and/or transmitting uplink signal successfully prior to executing the handover command, it may assist the WTRU on the decision whether to start actions towards the target cell and safely interrupt the connection with the source cell.

A WTRU may be configured with CHO associated with one or more target cells. If the one or more target cells satisfy the handover execution criteria, the WTRU may monitor the PDCCH of the different target cells prior to executing the handover command.

Pre-configured target cells may transmit a signal (e.g., a DCI) in a dedicated CORESET for the WTRUs configured with a CHO. The source cell may inform the target cell about the identity of the WTRU configured with the CHO command.

The WTRU may receive a configuration for a search space associated to this specific CORESET in the potential target cell in the conditional handover command. The WTRU may then select and execute the handover command only on the target cell where it was able to decode the DCI.

Prior to executing a handover command, the WTRU may get further information regarding the uplink robustness in the target cell by transmitting an SRS like signal. If the signal is received successfully, or the measurement results associated to the uplink signal is above a configured threshold, the target cell may transmit an indication to the WTRU through the source cell. This indication may trigger the actual handover execution on the target cell.

A WTRU may be configured with one or more triggers as described above, in addition to legacy measurement events and any triggers related to conditional handover, to perform one or more of the following actions. The WTRU may transmit a measurement report to serving cell. The WTRU may perform conditional handover.

The WTRU may initiate access using resources of a cell that is not the serving cell. This may allow the WTRU to perform a mobility procedure while the WTRU has limited but at least a sufficient configuration to initiate access and/or to be identified in the non-serving cell. For example, the configuration may minimally include a serving frequency and a cell identity, or the like. Identification may be based on a configured identity for the WTRU, possibly a RAN-area specific identity. The mobility procedure may be generally referred to as a forward mobility procedure or as an uplink mobility procedure.

The WTRU may be configured to perform specific action when a trigger condition is satisfied. The configuration may be explicitly (e.g., linked to a trigger, configured as part of measurement object, etc.) or may be implicit based on the serving cell quality and/or status of RLM process.

The following description includes modification to conventional systems in support of conditional handover.

Table 1 includes example steps that a WTRU may perform upon reception of a RRC reconfiguration message.

TABLE 1

Reception of an RRC Reconfiguration by the WTRU

The WTRU shall perform the following actions upon reception of the RRCReconfiguration:
```
1>  if the RRCReconfiguration message includes conditionalReconfig:
    2>  perform the conditional reconfiguration procedure as specified in 5.3.5.11
    2>  the procedure ends. //this is to avoid performing any further actions in the rest of this section.
1>  if the RRCreconfiguration message includes the NR masterCellGroup:
    2>  perform the cell group configuration for the NR MCG according to 5.3.5.5.
1>  if the RRCReconfiguration includes the secondaryCellGroup:
    2>  perform the cell group configuration for the SCG according to 5.3.5.5.
1>  if the RRCReconfiguration message contains the radioBearerConfig:
    2>  perform the radio bearer configuration according to 5.3.5.6.
1>  if the RRCReconfiguration message includes the measConfig:
    2>  perform the measurement configuration procedure as specified in 5.5.2.
1>  if the RRCReconfiguration message includes the NR masterCellGroup:
    2>  construct RRCReconfigurationComplete message and submit it via the NR MCG
    2>  if reconfigurationWithSync was included in spCellConfig of an NR MCG:
        3>  initiate the random-access procedure on the SpCell, as specified in TS 38.321 [3].
1>  else if the WTRU is configured with E-UTRA nr-SecondaryCellGroupConfig (MCG is E-UTRA):
    2>  if RRCReconfiguration was received via SRB1:
        3>  construct RRCReconfigurationComplete message and submit it via the EUTRA MCG
            embedded in E-UTRA RRC message RRCConnectionReconfigurationComplete as
            specified in TS 36.331 [10];
```

TABLE 1-continued

Reception of an RRC Reconfiguration by the WTRU

> > 3> if reconfigurationWithSync was included in spCellConfig of an SCG:
> > > 4> initiate the random access procedure on the SpCell, as specified in TS 38.321 [3].
> > 2> else (RRCReconfiguration was received via SRB3):
> > > 3> submit the RRCReconfigurationComplete message via SRB3 to lower layers for transmission using the new configuration.
> > NOTE: In the case of SRB1, the random access is triggered by RRC layer itself as there is not necessarily other UL transmission. In the case of SRB3, the random access is triggered by the MAC layer due to arrival of RRCReconfigurationComplete.
> 1> if MAC of an NR cell group successfully completes a random access procedure triggered above;
> > 2> stop timer T304 for that cell group;
> > 2> for each storedReconfig in VarConditionalReconfigList perform the removal procedure according to 5.3.5.14.
> > 2> apply the parts of the CQI reporting configuration, the scheduling request configuration and the sounding RS configuration that do not require the WTRU to know the SFN of the respective target SpCell, if any;
> > 2> apply the parts of the measurement and the radio resource configuration that require the WTRU to know the SFN of the respective target SpCell (e.g. measurement gaps, periodic CQI reporting, scheduling request configuration, sounding RS configuration), if any, upon acquiring the SFN of that target SpCell;
> > 2> the procedure ends.

Table 2 includes example steps that a WTRU may perform to initiate a conditional reconfiguration.

TABLE 2

Initiation of conditional reconfiguration

The WTRU shall:
> 1> if a storedReconfig entry with the matching physCellId exists within the VarConditionalReconfigList, for this entry:
> > 2> reconfigure the entry with the contents received in the received RRCReconfiguration message.
> 1> else
> > 2> add a new entry storedReconfig within the VarConditionalReconfigList and store the received RRCReconfiguration message:
> 1> (Re-)start timer T380 for the corresponding storedReconfig with the timer value set to t380, as included in the RRCReconfiguration message;
> 1> As long as at least one storedReconfig exisits in VarConditionalReconfigList, for each storedReconfig within VarConditionalReconfigList:
> > 2> if a measurement gap configuration is setup, or
> > 2> if the WTRU does not require measurement gaps to perform the concerned measurements:
> > > 3> if s-MeasureConfig is not configured, or
> > > 3> if s-MeasureConfig is set to ssb-RSRP and the NR SpCell RSRP based on SS/PBCH block, after layer 3 filtering, is lower than ssb-RSRP,or
> > > 3> if s-MeasureConfig is set to csi-RSRP and the NR SpCell RSRP based on CSI-RS, after layer 3 filtering, is lower than csi-RSRP:
> > > > 4> if the rsType is set to csi-rs:
> > > > > 5> derive measurement results associated with physCellId based on CSI-RS for each trigger quantity indicated in triggerCondition, as described in 5.5.3.3.
> > > > 4> if the rsType is set to ssb:
> > > > > 5> derive cell measurement results associated with physCellId based on SS/PBCH block for each trigger quantity indicated in triggerCondition as described in 5.5.3.3.
> > 2> perform the evaluation of triggerCondition as specified in 5.5.4.

Table 3 includes example steps that a WTRU may perform to execute conditional reconfiguration.

TABLE 3

Execution of conditional reconfiguration

The WTRU shall:
> 1> if an entry condition applicable for a eventId associated with triggerCondition of a storedReconfig within VarConditionalReconfigList, is fulfilled for the corresponding physCellId after layer 3 filtering taken during timeToTrigger defined for this event:
> > NOTE2: When multiple trigger conditions are satisfied at the same time, the WTRU may choose a target cell based on following conditions (e.g. prefer target cell with dedicated resource, prefer the best target cell quality, prefer highest priority target cell e.g. based on explicit network configuration or implicit based on trigger condition etc)

TABLE 3-continued

Execution of conditional reconfiguration

2> remove the corresponding storedReconfig according to 5.3.5.14
2> assume a RRCReconfiguration message with the same contents of the storedReconfig is received without the conditionalReconfig.
2>perform actions defined for reception of an RRCReconfiguration according to 5.3.5.3.

Table 4 includes example steps that a WTRU may perform to handle the expiration of T380.

TABLE 4

Handling T380 expiry

The WTRU shall:
1> if T380 associated with a storedReconfig expires:
    2> perform actions defined in 5.3.5.14 for the corresponding storedReconfig.

Table 5 includes example steps that a WTRU may perform to remove a stored reconfiguration.

TABLE 5

StoredReconfig removal

The WTRU shall, for each storedReconfig to be removed:
    1> stop performing measurements and monitoring the triggerCondition for the physCellId associated with the storedReconfig.
    1> stop timer T380 associated with the storedReconfig, if running.
    1> remove the entry associated with the storedReconfig in the VarConditionalReconfigList.
    NOTE 1: Following the removal of storedReconfig entry, any dedicated preamble, if provided within the rach-ConfigDedicated, is not available for use by the WTRU anymore.

Table 6 includes example steps that a WTRU may perform to detect RLF.

TABLE 6

Detection of radio link failure

The WTRU shall:
1> upon T310 expiry in PCell; or
1> upon random access problem indication from MCG MAC while T311 is not running; or
1> upon indication from MCG RLC that the maximum number of retransmissions has been reached:
    2> consider radio link failure to be detected for the MCG i.e. RLF;
    2> if AS security has not been activated:
        3> perform the actions upon leaving RRC_CONNECTED, with release cause 'other'.
    2> else if at least one storedReconfig exists within VarConditionalReconfigList and a cell associated with the phycellID specified in storedReconfig satisfies cell selection criteria, then:
        3> assume triggerCondition is satisfied for the corresponding storedReconfig and perform actions for execution of conditional reconfiguration as specified in 5.3.5.12
    NOTE: When multiple suitable target cell exists in storedReconfig, the WTRU may choose a target cell based on following conditions (e.g. prefer target cell with dedicated resource, prefer the target cell with highest quality , prefer highest priority target cell e.g. based on explicit network configuration or implicit based on trigger condition etc.)
    2> else:
        3> initiate the connection reestablishment procedure.

As described above, the RRCReconfiguration message may be a command to modify an RRC connection. It may convey information for measurement configuration, mobility control, radio resource configuration (including RBs, MAC main configuration and physical channel configuration) including and security configuration. Table 7 includes an example format of the RRCReconfiguration message.

TABLE 7

RRCReconfiguration message

-- ASN1START
-- TAG-RRCRECONFIGURATION-START

TABLE 7-continued

| RRCReconfiguration message |
|---|
| RRCReconfiguration ::=    SEQUENCE {<br>    rrc-TransactionIdentifier    RRC-TransactionIdentifier,<br>    criticalExtensions    CHOICE {<br>        rrcReconfiguration    RRCReconfiguration-IEs,<br>        criticalExtensionsFuture    SEQUENCE { }<br>    }<br>}<br>RRCReconfiguration-IEs ::=    SEQUENCE {<br>    -- Configuration of trigger condition and other parameters associated with conditional reconfiguration<br>    conditionalReconfig    ConditionalReconfig<br>    OPTIONAL, -- Need M<br>    -- Configuration of Radio Bearers (DRBs, SRBs) including SDAP/PDCP.<br>    -- In EN-DC this field may only be present if the RRCReconfiguration<br>    -- is transmitted over SRB3.<br>    radioBearerConfig    RadioBearerConfig<br>    OPTIONAL, -- Need M<br>    -- Configuration of master cell group:<br>    masterCellGroup    OCTET    STRING<br>(CONTAINING CellGroupConfig)<br>OPTIONAL, -- Need M<br>    -- Configuration of secondary cell group (EN-DC):<br>    secondaryCellGroup    OCTET    STRING<br>(CONTAINING CellGroupConfig)    OPTIONAL,<br>-- Need M<br>    measConfig    MeasConfig<br>        OPTIONAL, -- Need M<br>    lateNonCriticalExtension    OCTET STRING<br>    OPTIONAL,<br>    nonCriticalExtension    SEQUENCE { }<br>    OPTIONAL<br>}<br>-- TAG-RRCRECONFIGURATION-STOP<br>-- ASN1STOP |

The Conditional Reconfig information element may be used to configure trigger conditions and parameters associated with conditional reconfiguration. Table 8 shows the formation of the Conditional Reconfig information element.

TABLE 8

| ConditionalReconfig information element |
|---|
| -- ASN1START<br>-- TAG-CONDITIONALRECONFIG-START<br>ConditionalReconfig::=    SEQUENCE {<br>    triggerCondition    EventTriggerConfig,<br>    t380    ENUMERATED<br>{ms50, ms100, ms200, ms500, ms1000, ms2000, ms4000, ms6000, infinity},<br>    ...<br>}<br>-- TAG- CONDITIONALRECONFIG -STOP<br>-- ASN1STOP |

The variable VarConditionalReconfigList may include information about one or more target cells for which the triggering conditions are monitored. Table 9 shows the format of the VarConditionalReconfigList variable.

TABLE 9

| VarConditionalReconfigList variable |
|---|
| -- ASN1START<br>-- TAG-VAR-CONDITIONAL-RECONFIG-START<br>VarConditionalReconfigList::=    SEQUENCE (SIZE (1..maxNrofConRecon))<br>OF VarConditionalReconfig<br>VarConditionalReconfig ::=    SEQUENCE {<br>    -- List of conditional reconfigurations that have been stored by the WTRU<br>    storedReconfig    RRCReconfiguration-IEs,<br>}<br>-- TAG-CONDITIONAL-RECONFIG-STOP<br>-- ASN1STOP |

Figure 5:
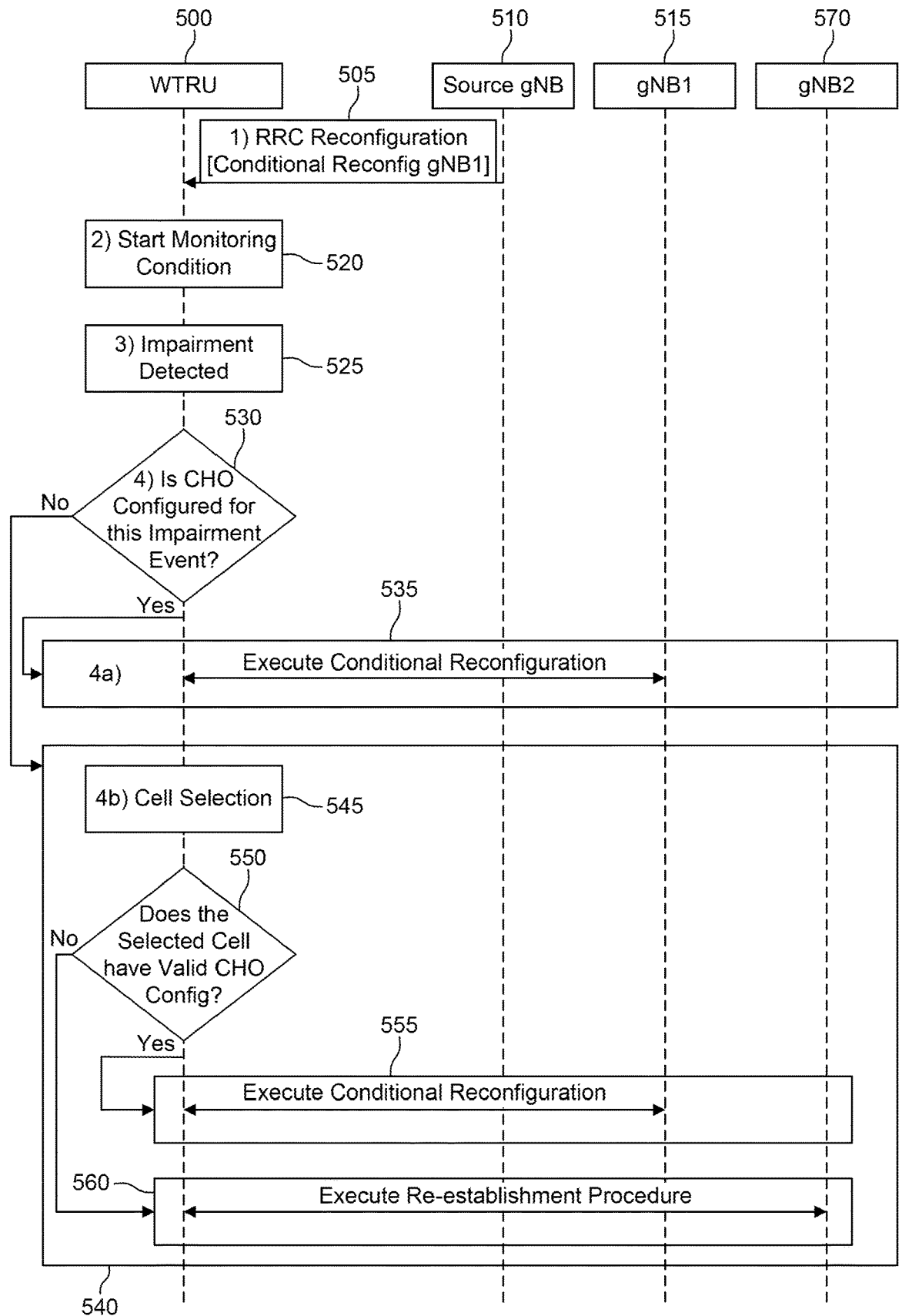
FIG. 5 is a message sequence chart illustrating an example procedure for reestablishment which includes a fallback to a conditional handover.

FIG. 5 is a message sequence chart illustrating an example procedure for reestablishment which includes a fallback to CHO. In the example of FIG. 5, a WTRU 500 receives a message 505 (e.g., an RRC Reconfiguration message) from source gNB 510, which includes a conditional reconfiguration for gNB1 515. WTRU 500 may receive message 505, for example, after it connects to source gNB 510. The conditional reconfiguration may include a trigger condition, and the configuration to be applied at gNB1 515 if the trigger condition occurs. The trigger condition may include, for example, whether the quality of source gNB 510 is less than the quality (e.g., in terms of RSRP, RSRQ, or SINR with respect to the WTRU) of gNB1 515. WTRU 500 begins monitoring the trigger condition at step 520. On condition 525 that a WTRU 500 detects an impairment event, which may or may not satisfy the trigger condition. On condition 530 that the detected impairment satisfies the trigger condition, WTRU 500 executes the conditional reconfiguration from message 505 with gNB1 515 in step 535. On condition 525 that the detected impairment does not satisfy the trigger condition (e.g., there was an RLF with source gNB 510), WTRU 500 enters an enhanced reestablishment procedure 540. In enhanced reestablishment procedure 540, the WTRU performs a cell selection in step 545. For example, the WTRU may select a cell based on one or more of any suitable criteria, such as highest signal quality, highest number of beams detectable by the WTRU, whether the cell has a valid CHO, and so forth. On condition 550 that the selected cell has a valid (e.g., unexpired) CHO configuration (which may be the configuration from message 505, or may be a different configuration), WTRU 500 executes a CHO to the selected cell (e.g., gNB1 515 in this example) in step 555, even though the condition of the conditional reconfiguration is not satisfied. On condition 550 that the selected cell does not have a valid (e.g., unexpired) CHO configuration, WTRU 500 executes a reestablishment procedure with the selected cell (e.g., gNB2 570 in this example) in step 560. In this example, WTRU 500 does not execute a handover to gNB2 570 because it is not configured for a handover.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for communication by a wireless transmit/receive unit (WTRU) associated with a source cell, the method comprising:
   detecting a radio link failure (RLF);
   after detecting the RLF, performing a cell selection procedure and selecting a cell; and
   responsive to the selected cell being a candidate for a conditional handover (CHO) configuration, performing a CHO to the selected cell.

2. The method of claim 1, wherein the CHO configuration comprises a configured target cell.

3. The method of claim 1, wherein the CHO configuration comprises a trigger condition.

4. The method of claim 3, wherein the CHO configuration comprises a threshold quality of a source gNB.

5. The method of claim 1, wherein the CHO configuration comprises a trigger condition different from the RLF.

6. The method of claim 1, wherein the CHO configuration is different from the RLF.

7. The method of claim 1, further comprising, responsive to the selected cell being associated with the CHO configuration, performing the CHO to the selected cell regardless of whether a trigger condition of the CHO is satisfied.

8. The method of claim 1, further comprising, responsive to the selected cell being associated with the CHO configuration, performing the CHO to the selected cell based on a trigger condition different from the trigger condition of the CHO.

9. The method of claim 1, further comprising, responsive to the selected cell being associated with a different CHO configuration, performing the CHO to the selected cell on a condition that the CHO is valid.

10. The method of claim 1, further comprising, responsive to the selected cell being associated with a different CHO configuration, performing the CHO to the selected cell on a condition that the CHO is unexpired.

11. A wireless transmit/receive unit (WTRU) associated with a source cell, the WTRU comprising:
    a transceiver; and
    a processor;
    the transceiver and the processor configured to detect a radio link failure (RLF);
    the transceiver and the processor configured to perform, after detecting the RLF, a cell selection procedure and select a cell;
    the transceiver and the processor configured to perform, responsive to the selected cell being a candidate for a conditional handover (CHO) configuration, a CHO to the selected cell; and
    the transceiver and the processor configured to perform, on a condition that the selected cell is not associated with the CHO configuration, a reestablishment procedure.

12. The WTRU of claim 11, wherein the CHO configuration comprises a configured target cell.

13. The WTRU of claim 11, wherein the CHO configuration comprises a trigger condition.

14. The WTRU of claim 13, wherein the CHO configuration comprises a threshold quality of a source gNB.

15. The WTRU of claim 11, wherein the CHO configuration comprises a trigger condition different from the RLF.

16. The WTRU of claim 11, wherein the CHO configuration is different from the RLF.

17. The WTRU of claim 11, wherein the transceiver and the processor are configured to, responsive to the selected cell being associated with the CHO configuration, perform the CHO to the selected cell regardless of whether a trigger condition of the CHO is satisfied.

18. The WTRU of claim 17, wherein the transceiver and the processor are configured to, responsive to the selected cell being associated with the CHO configuration, perform the CHO to the selected cell based on a trigger condition different from the trigger condition of the CHO.

19. The WTRU of claim 11, wherein the transceiver and the processor are configured to, responsive to the selected cell being associated with a different CHO configuration, perform the CHO to the selected cell on a condition that the CHO is valid.

20. The WTRU of claim 11, wherein the transceiver and the processor are configured to, responsive to the selected cell being associated with a different CHO configuration, perform the CHO to the selected cell on a condition that the CHO is unexpired.

* * * * *